United States Patent [19]

Setzer et al.

[11] 3,994,695

[45] Nov. 30, 1976

[54] COMPOSITE ALUMINUM BRAZING SHEET

[75] Inventors: William C. Setzer, Creve Coeur, Mo.; Philip R. Sperry, North Haven; Joseph Winter, New Haven, both of Conn.; Douglas L. Graham, Ballwin, Mo.

[73] Assignee: Swiss Aluminium Ltd., Chippis, Switzerland

[22] Filed: Nov. 5, 1975

[21] Appl. No.: 629,100

Related U.S. Application Data

[63] Continuation-in-part of Ser. No. 519,554, Oct. 31, 1974, abandoned.

[52] U.S. Cl. .................................. 29/197.5; 75/138
[51] Int. Cl.² ........................................ B32B 15/20
[58] Field of Search .............. 29/504, 197.5; 75/138

[56] References Cited
UNITED STATES PATENTS

| | | |
|---|---|---|
| 3,386,820 | 6/1968 | Jagaciak .............................. 75/138 |
| 3,788,824 | 1/1974 | Singleton, Jr. et al. ............. 29/197.5 |
| 3,891,400 | 6/1975 | Robinson ............................ 29/197.5 |
| 3,898,053 | 8/1975 | Singleton, Jr. et al. ............. 29/197.5 |

*Primary Examiner*—Arthur J. Steiner
*Attorney, Agent, or Firm*—Robert A. Dawson; Robert H. Bachman; David A. Jackson

[57] ABSTRACT

A composite aluminum alloy brazing sheet and methods of producing the brazing sheet are disclosed. The brazing sheet includes a non-heat treatable aluminum base alloy core containing zirconium, chromium and manganese as the alloying ingredients. Bonded to at least one of the major face surfaces of the core is an aluminum base alloy sheet containing silicon plus optional additions of copper, zinc and magnesium. The core alloy resists softening and sagging at brazing temperatures while retaining good mechanical properties after the brazing operation is completed.

7 Claims, 3 Drawing Figures

COMPOSITE ALUMINUM BRAZING SHEET

CROSS-REFERENCE TO RELATED APPLICATION

This application is a continuation-in-part of Ser. No. 519,554, filed Oct. 31, 1974, now abandoned.

BACKGROUND OF THE INVENTION

Brazing is a commonly used fabrication method for producing complex aluminum articles. Brazing sheet is often used and consists of an aluminum alloy core having a high melting point and a layer of lower melting point aluminum alloy on at least one surface of the core. When this composite sheet is heated to brazing temperatures, the surface alloy melts and flows into joints as a result of capillary action. For proper functioning the melting of the surface alloy must occur at a temperature where the core alloy possesses adequate creep strength so as to resist deformation and distortion. In conventional composite brazing sheet materials the temperature difference between the melting point of the surface alloy and softening point of the core alloy is so small that it is difficult to control the brazing temperature to a close enough tolerance so that the surface alloy is melted and the core alloy is not distorted. Commonly used core alloys include Aluminum Association Alloy 3003 and Aluminum Association Alloy 6951. Aluminum Association Alloy 6951 is a heat treatable alloy and therefore requires careful temperature control and cooling control after the brazing cycle. Alloy 6951 also tends to sag excessively when subjected to brazing temperatures greater than 1100° F. Most users prefer Aluminum Association Alloy 3003 as a core alloy since it is more resistant to sagging and deformation than is Aluminum Association Alloy 6951. However, even Alloy 3003 tends to sag when subjected to temperatures greater than 1100° F. The mechanical properties of Alloy 3003 after brazing is completed are generally not good enough for applications subjected to high stress.

SUMMARY OF THE INVENTION

The present invention resides in a composite aluminum brazing sheet in which the core material has a high resistance to sagging at elevated temperatures, has superior mechanical properties in comparison with Aluminum Association 3003 and is non-heat treatable to eliminate the necessity for very careful and costly temperature control of the alloy after brazing. The surface alloy may be one of several alloys of the generic type which contain silicon and optionally copper, zinc and magnesium.

It is an object of the present invention to disclose an aluminum composite brazing sheet having superior properties.

It is a further object of the present invention to disclose an aluminum composite brazing sheet in which the core alloy has exceptional resistance to creep and deformation at elevated temperatures.

It is yet a further object of the present invention to disclose a composite brazing sheet in which the core alloy has good mechanical properties after the brazing cycle.

Further objects and advantages of the present invention will appear from the ensuing specification.

BRIEF DESCRIPTION OF THE DRAWINGS

The nature of the invention will be better understood from the following description, taken in conjunction with the accompanying drawings in which.

DETAILED DESCRIPTION

Figure 1:
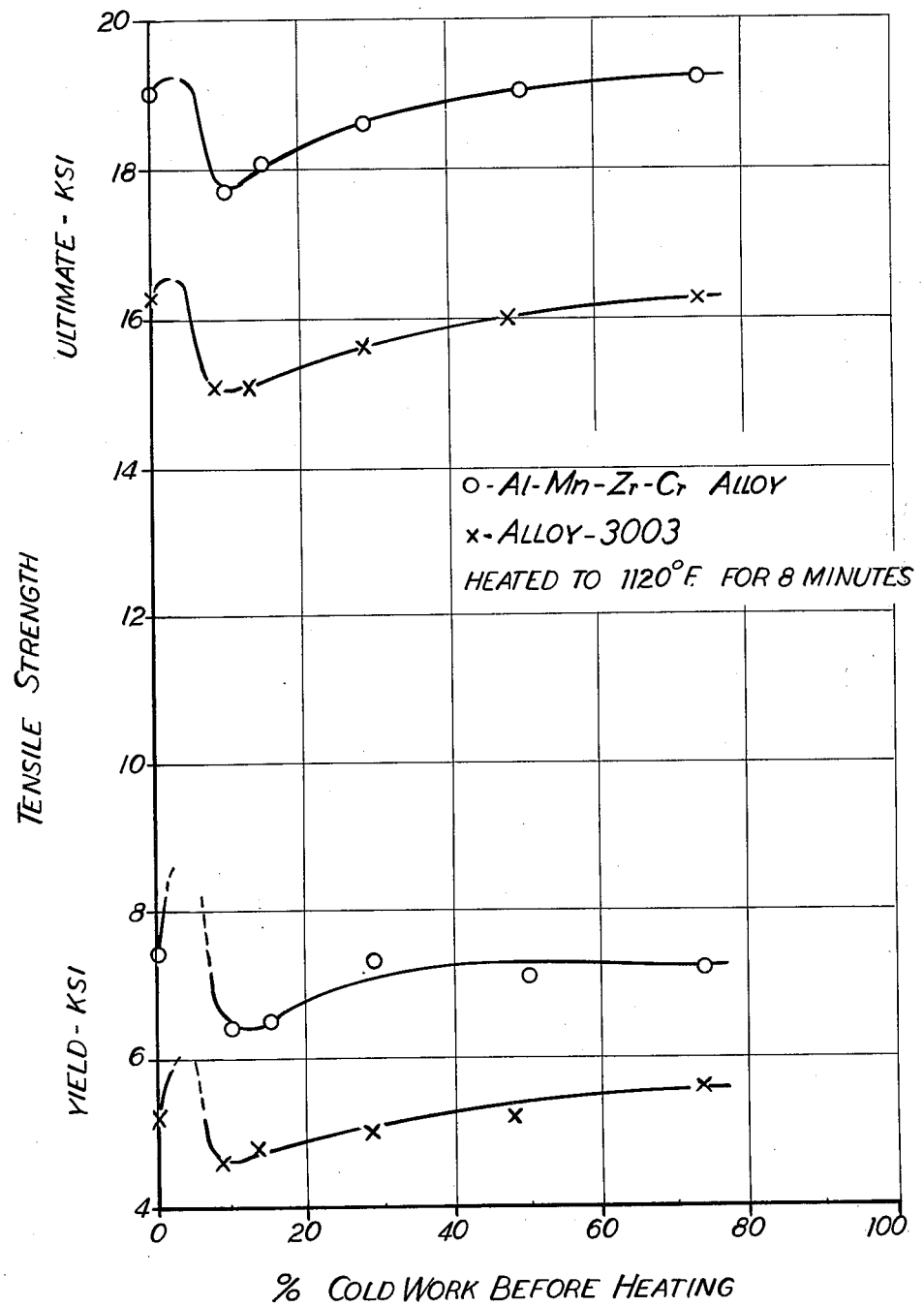
FIGS. 1 and 2 are graphs showing tensile properties of the core alloy of the present invention and Aluminum Association Alloy 3003 as a function of prior cold work before exposure to the simulated brazing cycle.

The present invention consists of an aluminum alloy made up of a non-heat treatable core component and at least one surface component bonded thereto. The broad and preferred composition ranges of the core component are listed below in Table I in which all ranges are given in weight percent.

TABLE I

|  | Broad | Preferred |
| --- | --- | --- |
| Manganese | 0.3 – 1.5 | 0.5 – 1.3 |
| Zirconium | 0.1 – 0.7 | 0.15 – 0.25 |
| Chromium | 0.1 – 0.4 | 0.2 – 0.3 |
| Aluminum | Essentially Bal. | Essentially Bal. |

The core alloy, besides containing the alloy ingredients listed above in Table I, may also contain small amounts of such elements as iron, silicon, copper and titanium, present as impurities or intentionally added. While it is generally known that the addition of copper, copper plus magnesium, magnesium plus zinc or magnesium plus silicon to aluminum renders the resulting alloy heat treatable, it should be noted that silicon, by itself or combined with copper as used herein, does not render a non-heat treatable alloy heat treatable.

The surface component is an aluminum base alloy chosen for its melting point and general suitability for brazing applications. Typical brazing alloys suitable for use in the present invention include Aluminum Association Alloys 4343, 4145, 4047, 4045 and X4004. These alloys are characterized in that they have a melting temperature between 975° and 1125° F and are further characterized in that they all contain from 5 to 12% silicon. Further constituents of these alloys may include one or more of the following: up to 5% copper; up to 5% magnesium; and up to 10% zinc, with as little as 0.01% of each of these materials being contemplated.

The core alloy of the present invention achieves its desirable high temperature properties through the formation of small precipitate particles. These particles contain zirconium, chromium and manganese. In order to obtain optimum high temperature properties it is necessary that as much as possible of these added elements first be in solid solution.

In practice, the maximum saturation of the solid solution of zirconium and chromium in aluminum is obtained during solidification of the cast ingot, due to the sluggish diffusion of these elements and the fairly rapid rates of cooling. Subsequent thermal treatments, particularly the one known as "homogenization," tend to precipitate these elements to the extent that their equilibrium solubility at intermediate temperatures has been exceeded. The resulting precipitate particle size and density is governed by temperature, time of homogenizing and by subsequent effects of hot working which bring about additional precipitation. On the one hand, high temperature and long time homogenization, especially when followed by slow cooling, lead to coarser and less dense particle dispersions which are favorable for maintaining fine grain size and low earing upon final annealing of cold rolled sheet. On the other hand, low temperatures, even at extended times, produce fine, dense precipitate dispersions which inhibit recrystallization and are more favorable for higher retained strength after the brazing cycle. Nevertheless, the simultaneous presence of manganese, chromium and zirconium in the alloy of the base component of the present invention permits either type of homogenization to provide an advantage for brazing sheet. Therefore, the homogenization or preheating which precedes hot rolling may be performed on the as-cast ingot by subjecting it to a temperature of between 950° and 1150° F for a time of from 1 to 24 hours. Following this high temperature treatment the alloy may then be hot rolled to a suitable thickness at a temperature of from 600° to 1000° F. The final processing step is a cold working step to the desired final gage.

The cladding material may be applied by pressure welding during the hot rolling step or, alternatively, during the cold working step. The thickness of the brazing alloy on one or both sides will generally range from 5 to 15% of the final sheet thickness, with the thickness of the core material or base component preferably ranging from 0.005 to 0.250 inch.

The present invention will be made more clear through reference to the following illustrative examples.

EXAMPLE I

A direct chill cast ingot having a composition of 1.02% manganese, 0.20% zirconium, 0.23% chromium, 0.72% iron, 0.25% silicon, 0.22% copper and 0.15% titanium, balance essentially aluminum was heated in air at a temperature of 1000° F for 16 hours. The material was then hot rolled at a temperature of 800° F from a starting thickness of 2.63 inch to a final thickness of 0.200 inch. This hot rolled material was then cold rolled to 0.080 inch thickness and annealed at 675° F for 4 hours. The annealed material was then cold worked with a variety of reductions from 0 to 75%, heated to 1120° F for 8 minutes and then tensile tested. The results are shown in FIG. 1. Also shown in FIG. 1 are comparative data for commerically produced Aluminum Association Alloy 3003 which was obtained at 0.080 inch thickness, annealed, and tested under identical conditions to the alloy of the present invention. It can be seen that the core alloy of the present invention maintains an advantage of approximately 2 KSI yield strength and 3 KSI ultimate tensile strength over the entire range of cold work which might be encountered in forming operations prior to brazing. The exposure conditions, 1120° F for 8 minutes were chosen to be representative of the conditions which the core material would encounter during a typical brazing cycle.

EXAMPLE II

Figure 2:
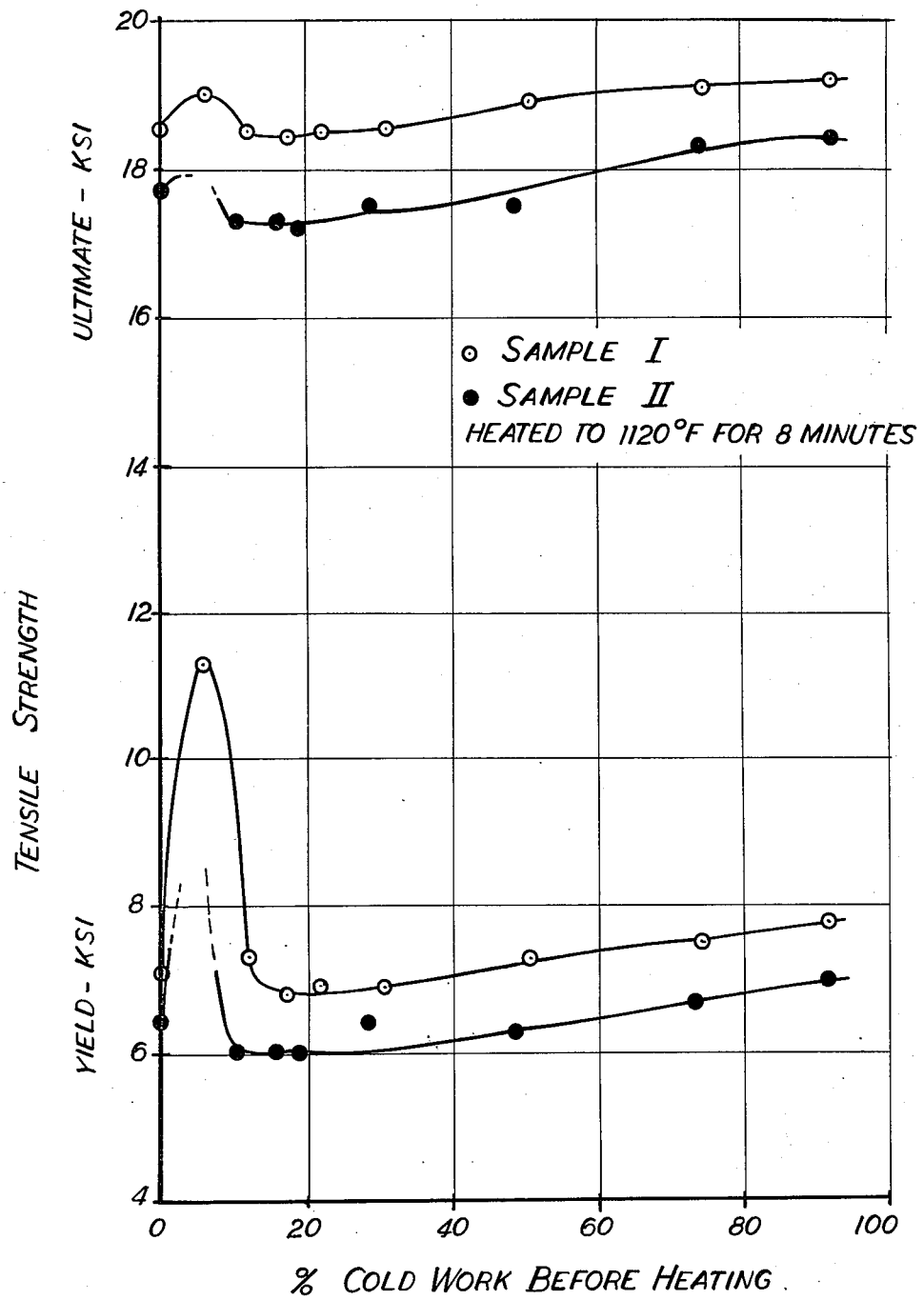

Samples of material having the same composition as that used in Example I were treated as follows: Sample I was homogenized at 1000° F for 16 hours, while Sample II was homogenized at 1125° F for 24 hours with a controlled heating rate of 50° F per hour from 600° F and a controlled cooling rate of 50° per hour to 1000° F. Materials from Sample I and Sample II were then cold worked varying amounts ranging from 0 to 92% and were then exposed to a temperature of 1120° F for 8 minutes. The tensile properties after this treatment are shown in FIG. 2. FIG. 2 demonstrates that the initial homogenization treatment can have a significant effect upon the mechanical properties of the brazing sheet after the brazing cycle. In this case it was also noted that the material designated as Sample II had better formability with less earing then the material designated as Sample I.

EXAMPLE III

Figure 3:
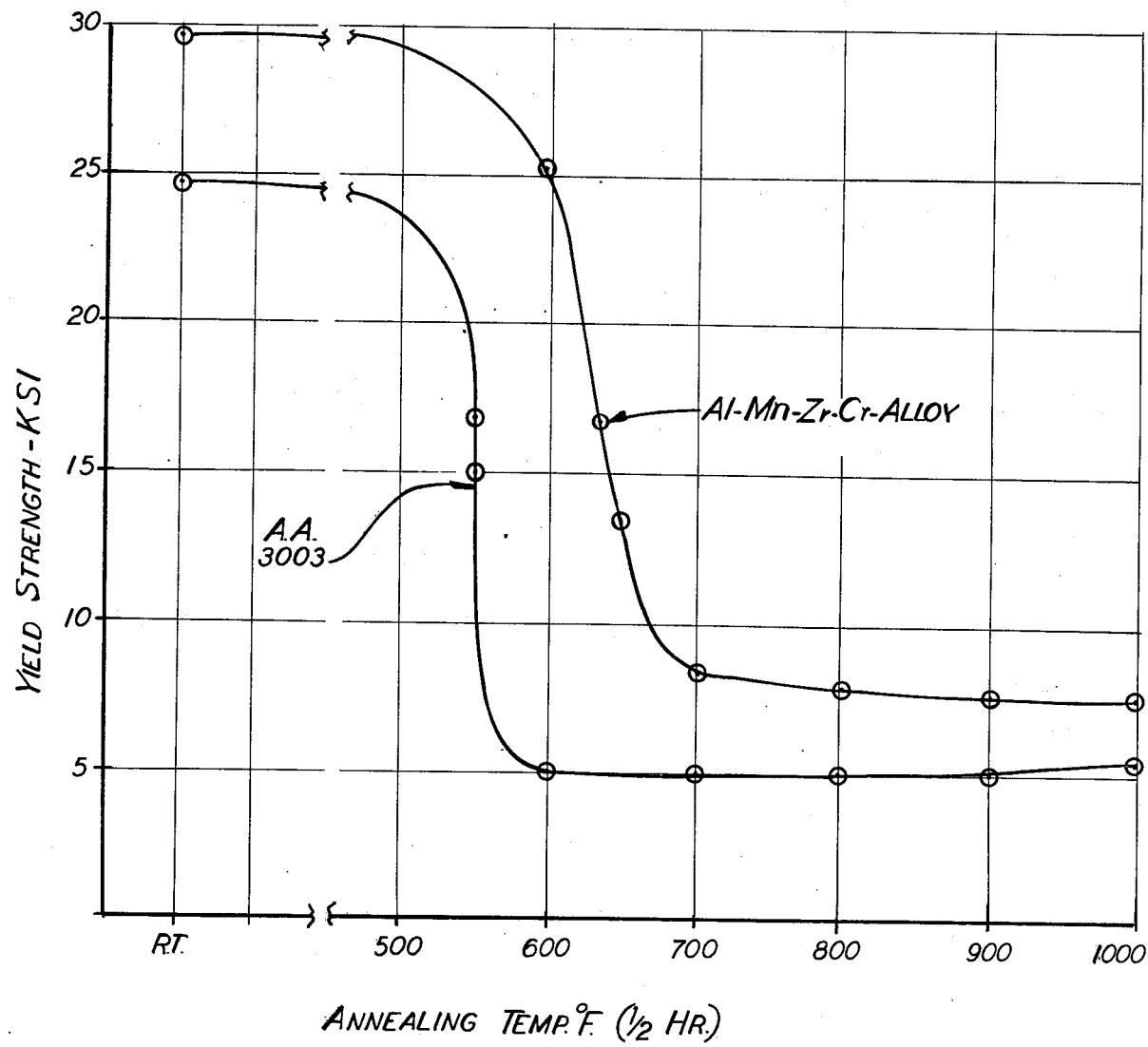
FIG. 3 is a graph showing the annealing response of the two alloys after 50% cold reduction.

Material which has been treated as described in Example II, Sample I, was cold worked 50% and annealed for one-half hour at a variety of temperatures from 500° to 900° F. Samples of Alloy 3003 which had been treated in a similar fashion were also cold worked 50% and annealed at the same temperature range. FIG. 3 shows a comparison of the tensile yield strength of these two materials. It is noteworthy that in a starting condition, with 50% cold work, the core alloy of the present invention has a yield strength of approximately 5 KSI greater than the yield strength of Alloy 3003. Even at a temperature of 900° F, after recrystallization has occurred the alloy of the present invention is approximately 2.5 KSI stronger than the 3003 Alloy. It is also interesting to note that the core alloy of the present invention has an effective softening temperature approximately 75° F greater than that of Alloy 3003.

EXAMPLE IV

Another important mechanical property which determines a metal's suitability for brazing is its resistance to short term creep at the brazing temperature. The creep properties of the core alloy of the present invention were compared with the creep properties of Alloy 3003 in the following fashion: A strip of metal was clamped in a fixture so that it extended in a horizontal plane. A 6 inch length was left free and unsupported. These strips were heated at a temperature of 1110° F for various times ranging up to 20 minutes. After the desired exposure time the sample was removed from the furnace and the amount which the sample had sagged from the original horizontal plane was noted. Both the core alloy of the present invention and the 3003 Alloy were tested at 0.060 inch gage in the annealed and 50% cold worked tempers. The results are listed in Table II.

Consideration of the data in Table II shows that under all equivalent conditions, the core component of the present invention is noticeably more resistant to sagging than the 3003 Alloy.

TABLE II

SAG TEST DATA UNDER BRAZING CONDITIONS

| Alloy | Initial Temper | Gauge | Amount of sag (inches) at end of 6" long cantilevered strip after various times of heating at 1110° F | | |
|---|---|---|---|---|---|
| | | | 5 Min. | 10 Min. | 20 Min. |
| 3003 | Annealed | 0.060" | * | 0.72 | 0.85 |

TABLE II-continued

SAG TEST DATA UNDER BRAZING CONDITIONS

| Alloy | Initial Temper | Gauge | Amount of sag (inches) at end of 6" long cantilevered strip after various times of heating at 1110° F | | |
|---|---|---|---|---|---|
| | | | 5 Min. | 10 Min. | 20 Min. |
| 3003 | 50% C.W. | 0.060" | 1.15,1.25 | 1.29,1.43,1.65 | 1.93,1.97,1.83 |
| Al-Mn-Zr-Cr | Annealed | 0.060" | * | 0.05 | 0.24 |
| Al-Mn-Zr-Cr | 50% C.W. | 0.060" | 0.27,0.36 | 0.31,0.33 | 0.39,0.44 |

*Data not taken

This invention may be embodied in other forms or carried out in other ways without departing from the spirit or essential characteristics thereof. The present embodiment is therefore to be considered as in all respects illustrative and not restrictive, the scope of the invention being indicated by the appended claims and all changes which come within the meaning and range of equivalency are intended to be embraced therein.

What is claimed is:

1. A composite aluminum alloy brazing sheet comprising:
   A. a base component of a non-heat treatable aluminum base alloy consisting essentially of from 0.1 to 0.7% zirconium, from 0.1 to 0.4% chromium, from 0.3 to 1.5% manganese, balance aluminum, said base component having at least a first and second major surface in opposing relationship one with the other; and
   B. a surface layer bonded to at least one of the major surfaces of the base component, said surface layer comprising an aluminum base alloy consisting essentially of from 5 to 12% silicon, balance aluminum and having a melting point of from 975° to 1125° F.

2. A composite as in claim 1 wherein the surface layer is an aluminum base alloy containing a material selected from the group consisting of from 0.01 to 5% copper, from 0.01 to 5% magnesium, from 0.01 to 10% zinc, and mixtures thereof.

3. A composite as in claim 1 wherein the aluminum base alloy consists essentially of from 0.15 to 0.25% zirconium, from 0.2 to 0.3% chromium, from 0.5 to 1.3% manganese, balance essentially aluminum.

4. A composite as in claim 1 wherein the surface layer component is bonded to both sides of the base component.

5. A composite as in claim 1 wherein the thickness of the base component is from 0.005 to 0.250 inch.

6. A composite as in claim 1 wherein the thickness of the surface layer is from 5 to 15% of the total sheet thickness.

7. A composite as in claim 1 wherein the alloy of the base component contains small precipitate particles containing zirconium, chromium and manganese.

* * * * *